United States Patent
Hinckson

(10) Patent No.: US 7,635,965 B2
(45) Date of Patent: Dec. 22, 2009

(54) ELECTRIC POWER KING

(76) Inventor: Andre Edward Hinckson, 114-47 196th St., Queens, NY (US) 11412

( * ) Notice: Subject to any disclaimer, the term of this patent is extended or adjusted under 35 U.S.C. 154(b) by 0 days.

(21) Appl. No.: 10/986,722

(22) Filed: Nov. 12, 2004

(65) Prior Publication Data

US 2006/0103345 A1  May 18, 2006

(51) Int. Cl.
*H02J 7/14* (2006.01)
*H02J 7/00* (2006.01)
*H02J 7/04* (2006.01)
*H02J 3/02* (2006.01)
*H02J 3/00* (2006.01)

(52) U.S. Cl. .................. 320/105; 320/110; 320/111; 320/138; 320/160; 307/2; 307/17; 307/18; 307/22; 307/83

(58) Field of Classification Search ............ 320/105, 320/139, 104, 110, 111, 138, 160
See application file for complete search history.

(56) References Cited

U.S. PATENT DOCUMENTS 5,982,138 A * 11/1999 Krieger ............... 320/105
6,377,029 B1 * 4/2002 Krieger et al. ......... 320/139

OTHER PUBLICATIONS

Maxim, Cost-Saving Multichemistry Battery-Charger System, @ http://www.maxim-ic.com, 1996, pp. 1-12.*

* cited by examiner

*Primary Examiner*—Patrick J Assouad
*Assistant Examiner*—Yalkew Fantu

(57) ABSTRACT

A portable and integrated backup electric power supplies system, equipped with a battery. It comprises of an alternating current power supply, and a multifunction direct current power supply containing a variable voltage power supply, a dual polarity voltage power supply, a variable NIMH battery charger, a 12-volt lead-acid battery charger, and an automotive jumpstart system.

18 Claims, 1 Drawing Sheet

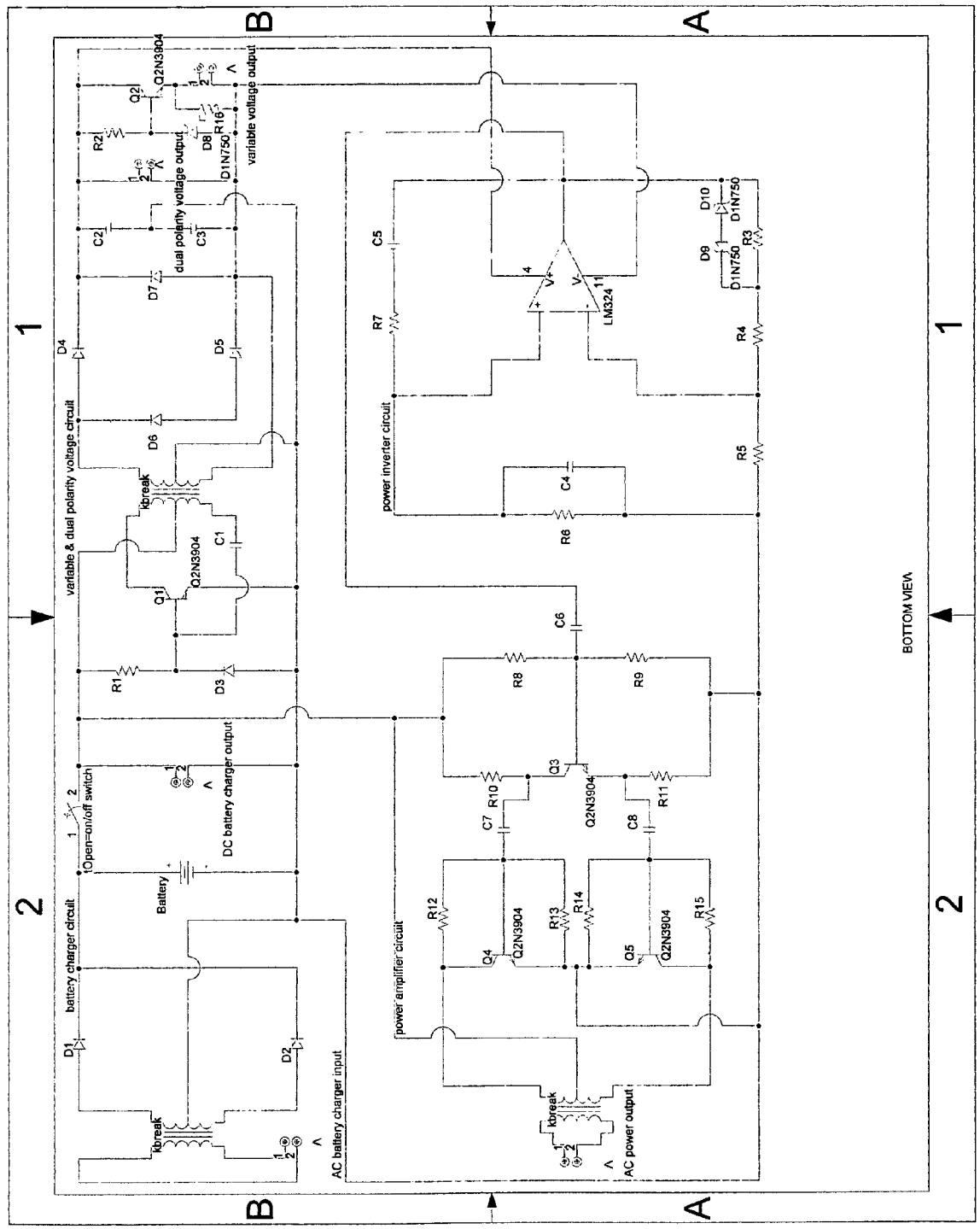

ELECTRIC POWER KING

This portable and integrated backup electric power supply system includes a 12-volt replaceable and rechargeable lead-acid battery adopted to provide power to:

An alternating current power supply which converts the direct current from its battery into an alternating current power source. It features a DC to AC sine wave electric power inverter, used for supplying power to -those- household equipment which plugs into a 120-volt AC power outlet.

A variable 12-volt direct current power supply capable of supplying a variety of DC voltages varying from 1.2volt to 12volts (e.g.,1.2, 2.4, 3.6, 4.8, 6, 7.2, 8.4, 9.6, 10.8, 12) depending on the desired amount. It is also used for supplying power to battery- operated devices, etc.

A variable NIMH battery charger used for recharging nickle-metal-hydroxide type batteries varying from 1.2volt to 12volts (e.g.,1.2, 2.4, 3.6, 4.8, 6, 7.2, 8.4, 9.6, 10.8, 12) depending on the desired amount.

A dual polarity 12-volt direct current power supply. This device contains two aiding six volts in series with the center grounded configuration used for computing-type devices -,which requires- requiring a dual polarity voltage (e.g.,+6 volts GND –6 volts).

A 12-volt automotive jumpstart system. This device is used for jump-starting automobiles, .etc.

A 12-volt lead-acid battery charger which recharges automotive and other Identical chemistry batteries, whenever the device is plugged into an AC power outlet.

DESCRIPTION OF THE DRAWING

The battery is connected to the on/off power switch, which contains a light emitting diode that illuminate whenever the device is turned on. The on/off power switch is connected to the lead-acid battery charger output, and the automotive jumpstart output. The on/off power switch is also connected to the dual polarity voltage power supply, and the variable voltage power supply. The dual polarity voltage power supply is connected to the DC to AC power inverter, which features a 60-hertz, sine wave generator and a 120-volts, 10-amp class B power amplifier. Please note: whenever this device is turned on, all of the circuits in this device works simultaneously until the battery is low or depleted, therefore this device allows its battery to be recharged or replaced. The battery might not supply power continuously, and cannot recharge itself or other identical batteries, so it must be recharged by plugging the device's 12-volt lead-acid battery charger into an AC power outlet. The battery is connected to the 12-volt lead-acid battery charger, which automatically recharges the battery whenever the device is plugged into an AC power outlet. Fuses are also used at each output to prevent circuits overload.

SUMMARY

This invention pertains to portable backup power supplies. It works by connecting a battery to each of these devices; a DC to AC power inverter, a variable voltage power supply, a dual polarity voltage power supply, a variable NIMH battery charger, a 12-volt lead-acid battery charger, and an automotive jumpstart system. Instead of each separate unit, it cooperates all of the above. Thus, the intent of this invention is to supply a variety of electrical energy without the use of fuel at any time and anywhere.

What I claim as my invention is:

1. An integrated power converter, comprising:
   a multi-operational power-input circuit configured to receive power from an AC power source, a DC power source, or a combination of the AC power source and the DC power source;
   a multi-operational power-output circuit configured to receive power from the multi-operational power-input circuit, and to simultaneously provide power to i) a battery charger with first and second battery charger terminals conductively coupled with first and second circuit paths, ii) a variable voltage dual polarity voltage output circuit with a control means for controlling a variable voltage across first and second variable voltage output terminals, and iii) an AC power output circuit configured to supply a 60 hertz 120 volt AC power output signal across first and second AC output terminals; and,
   a switch configured to selectively open and close a first circuit path between the multi-operational power-input circuit and the multi-operational power-output circuit.

2. The integrated power converter of claim 1, the multi-operational power input circuit comprising a DC power source with a positive terminal coupled to the first circuit path, and a negative terminal coupled with a second circuit path.

3. The integrated power converter of claim 2, the DC power source comprising a lead-acid battery.

4. The integrated power converter of claim 2, the multi-operational power source circuit further comprising:
   an input transformer with primary and secondary coils, the primary coil configured to receive power from a 60 hertz AC line voltage, and wherein the secondary coil has first and second peak output terminals and a center tap terminal; and,
   a full wave rectifier circuit with a rectified output terminal coupled to the first circuit path, and first and second rectifier inputs respectively coupled with the first and second peak output terminals, wherein the center tap terminal is conductively coupled to the second circuit path.

5. The integrated power converter of claim 4, the multi-operational power-output circuit comprising a damping circuit configured to receive a full wave rectified signal from the first and second circuit paths, and to generated a dual polarity output signal having less voltage variance than the full wave rectified signal.

6. The integrated power converter of claim 5, the variable voltage dual polarity output configured to provide a signal derived from the dual polarity output signal.

7. The integrated power converter of claim 5, the AC power output circuit comprising a power output transformer with a primary coil and a secondary coil, each coil having first and second peak terminals, wherein the 120 volt AC 60 hertz power output is generated across the first and second terminals of the secondary coil of the power output transformer.

8. The integrated power converter of claim 7, the primary coil of the power output transformer further comprising a center tap terminal conductively coupled to the first circuit path.

9. The integrated power converter of claim 7, the AC power output circuit further comprising a power inverter circuit including an op-amp with first and second power input terminals electrically coupled to receive the dual polarity output signal, first and second signal input terminals, and an op-amp output terminal.

10. The integrated power converter of claim 9, the power inverter circuit further comprising a first feedback circuit coupled between the first op-amp signal input and the op-amp output terminal.

11. The integrated power converter of claim 10, the power inverter circuit further comprising and a second feedback circuit coupled between the inverted output signal second signal input terminal.

12. The integrated power converter of claim 11, the power inverter circuit further comprising a bridge circuit coupled between the first signal input terminal and the second signal input terminal.

13. The integrated power converter of claim 12, the first feedback circuit comprising at capacitor in series with a resistor.

14. The integrated power converter of claim 13, the second feedback circuit including a loop circuit comprising a plurality of diodes and a resistor.

15. The integrated power converter of claim 9, the AC power output circuit further comprising a power amplifier circuit with an amplifier input coupled with the op-amp output terminal.

16. The integrated power converter of claim 15, the power amplifier circuit further comprising first and second power output transistors with respective first and second bases, first and second emitters, and first and second collectors, the first collector coupled to the first peak terminal of the primary coil of the power output transformer and the second collector coupled with the second peak terminal of the primary coil of the power output transformer.

17. The integrated power converter of claim 16, the power amplifier circuit further comprising a driver transistor with an emitter, a collector and a base, the power amplifier circuit further comprising a first driver circuit coupling the collector of the driver transistor to the base of the first power output transistor, and a second driver circuit coupling the emitter of the driver transistor to the base of the second power output transistor.

18. The integrated power converter of claim 1, wherein the 60 hertz 120 volt AC power output signal comprises a sinusoidal waveform.

\* \* \* \* \*